J. G. UTZ.
LUBRICATOR.
APPLICATION FILED DEC. 5, 1908.
1,070,753.
Patented Aug. 19, 1913.
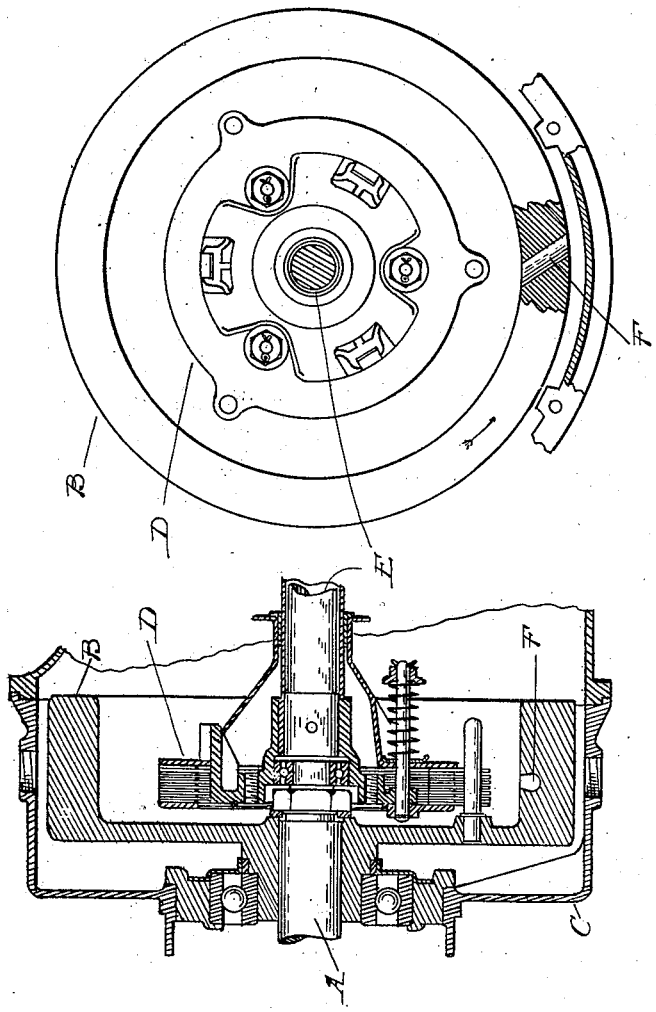
Witnesses
Inventor
John G. Utz
By Whittemore Hulbert & Whittemore
Attys.

UNITED STATES PATENT OFFICE.

JOHN G. UTZ, OF DETROIT, MICHIGAN, ASSIGNOR TO CHALMERS-DETROIT MOTOR COMPANY, OF DETROIT, MICHIGAN, A CORPORATION OF MICHIGAN.

LUBRICATOR.

1,070,753.     Specification of Letters Patent.     Patented Aug. 19, 1913.

Application filed December 5, 1908. Serial No. 466,158.

*To all whom it may concern:*

Be it known that I, JOHN G. UTZ, a citizen of the United States of America, residing at Detroit, in the county of Wayne and State of Michigan, have invented certain new and useful Improvements in Lubricators, of which the following is a specification, reference being had therein to the accompanying drawings.

It is the object of the invention to provide means for lubricating the parts of a rapidly revolving mechanism, such for instance as the main clutch in an automobile transmission.

To this end the invention consists in the means employed for propelling and directing the oil by the coöperation of its own inertia.

The invention further consists in the peculiar construction as hereinafter set forth.

In the drawings—Figure 1 is a longitudinal section through a motor fly wheel, its inclosing casing, and a friction clutch arranged within the fly wheel; Fig. 2 is a section at right angles to Fig. 1, showing the clutch in elevation.

A is the engine shaft, B the fly wheel, and C the inclosing casing.

D is a friction clutch arranged within the space inclosed by the rim of the fly wheel, and through the medium of which power is transmitted from the engine to the driven shaft E.

It is the particular object of the invention to provide means for lubricating the parts of this friction clutch which, as illustrated, is of the multi-disk type. This is accomplished by forming in the rim of the fly wheel B one or more passages F, which are oblique to the radius of the wheel. The lower portion of the casing C has formed therein an oil chamber and a portion of the periphery of the wheel B is constantly immersed in the oil. Thus, when the wheel is in rapid rotation, the oil entering the oblique passages F will be driven by the wheel, and, by reason of its inertia, will be propelled inward and thrown against the clutch D. The greater the speed of rotation of the wheel the greater the force with which the oil will be thrown inward, and consequently the clutch is constantly supplied with lubricant whenever the mechanism is in operation.

What I claim as my invention is:

1. The combination with a casing having an oil chamber in the lower portion thereof, of a device to be lubricated arranged within said casing, and means also within said casing rapidly revolving through the oil and radially spaced from said device to be lubricated, said means having a portion provided with a passage extending therethrough at an angle to the radius thereof for jetting the oil radially inward to said device through the open space between said device and said passage.

2. The combination with a casing having an oil chamber in its lower portion, of a device to be lubricated within said casing, an annular member surrounding and spaced from said device revolving through the oil, said annular member being provided with a passage therethrough oblique to the radius for jetting the oil radially inward to said device.

3. The combination with a casing having an oil chamber in the lower portion thereof, of mechanism to be lubricated arranged within said casing, and a motor fly-wheel surrounding said mechanism having a passage through the rim thereof oblique to the radius of the fly-wheel, said passage being adapted to jet the oil radially inward to said mechanism by the combined action of the rapid rotation of the fly-wheel and the inertia of the oil.

In testimony whereof I affix my signature in presence of two witnesses.

JOHN G. UTZ.

Witnesses:
NELLIE KINSELLA,
W. J. BELKNAP.